No. 656,043. Patented Aug. 14, 1900.
W. PATERSON.
FILTER.
(Application filed Oct. 20, 1899.)
(No Model.) 2 Sheets—Sheet 1.
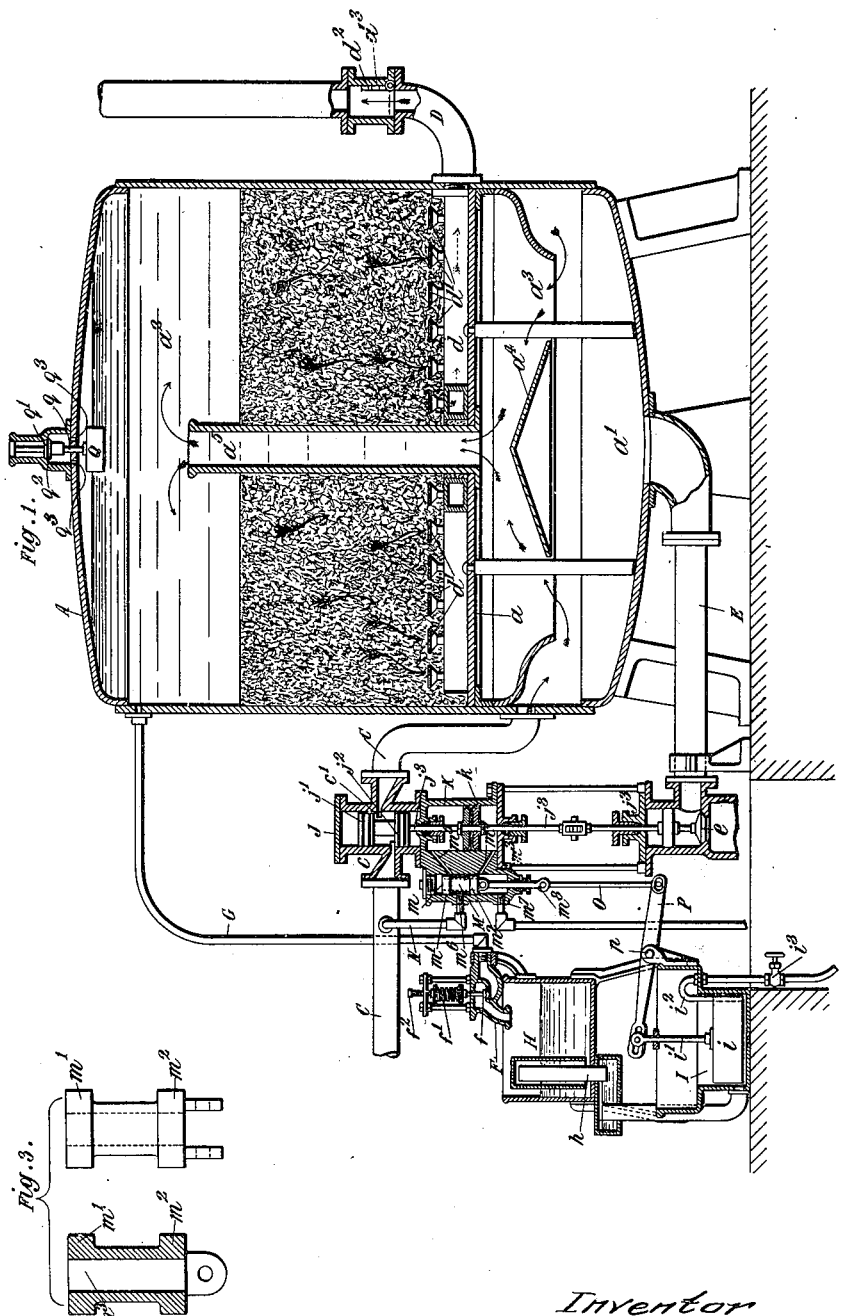
Witnesses:
Dennis Sumby.
N. Lee Helms
Inventor
William Paterson
By James L. Norris.
Attorney No. 656,043. Patented Aug. 14, 1900.
W. PATERSON.
FILTER.
(Application filed Oct. 20, 1899.)
(No Model.) 2 Sheets—Sheet 2.
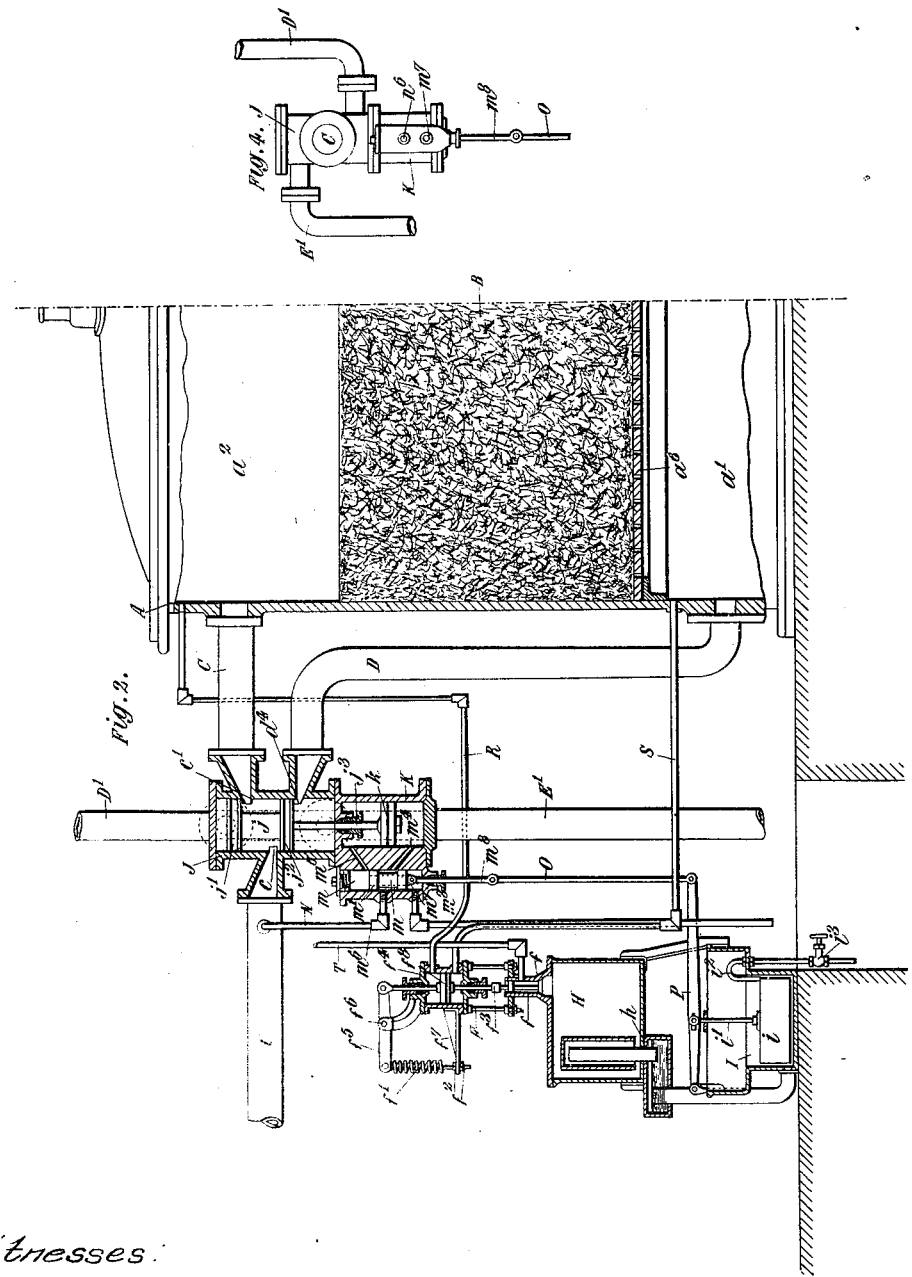
Witnesses:
Inventor
William Paterson
By James L. Norris,
Attorney

UNITED STATES PATENT OFFICE.

WILLIAM PATERSON, OF LONDON, ENGLAND.

FILTER.

SPECIFICATION forming part of Letters Patent No. 656,043, dated August 14, 1900.

Application filed October 20, 1899. Serial No. 734,258. (No model.)

*To all whom it may concern:*

Be it known that I, WILLIAM PATERSON, engineer, a subject of the Queen of Great Britain, residing at 14 Killarney road, Wandsworth, London, England, have invented certain new and useful Improvements in Filters, of which the following is a specification.

This invention relates to improvements in filters for filtering liquids, and has for its objects to utilize the increased pressure exerted by the liquid to be filtered on the filter-bed when the latter is foul or silted up and to automatically operate means whereby the flow of the liquid through the filter-bed is reversed, the filter-bed cleansed, and the filtering again started after such cleansing.

The essential feature of my invention consists in arranging a valve or equivalent device in connection with the filter-inlet or in connection with the filter inlet and outlet in such manner that when either the pressure on the inlet side of the filter or the excess of pressure at the inlet side of the filter over the pressure at the outlet side thereof exceeds a certain predetermined amount the said valve will open automatically and actuate means whereby the direction of the flow of liquid through the filter will be reversed and the filter opened to a drain-pipe for the purpose of cleansing the filter-bed and that when the pressure on the inlet side of the filter is relieved the said valve will close again automatically and cause the flow of liquid through the filter to be again reversed and the filtering operation to proceed.

In order that my invention may be clearly understood and readily carried into effect, I will now proceed to describe the same more fully in connection with the accompanying drawings, in which—

Figure 1 is a sectional elevation of a filter constructed according to my invention. Fig. 2 is a sectional elevation of a filter, showing a modified form of my invention. Fig. 3 shows a side view and a longitudinal section of the distributing-valve shown in Figs. 1 and 2 drawn to a larger scale. Fig. 4 is an end view of the reversing-valve and its connections drawn at right angles to Fig. 2.

The same letters of reference indicate like parts in all the figures.

Referring to Fig. 1, A is a closed filter-casing.

B is a filter-bed supported in the said casing by a plate $a$.

$a'$ is a chamber below the filter-bed B, and $a^2$ is a chamber above the said filter-bed.

$a^3$ and $a^4$ are respectively a deflecting-plate and a baffle-hood situated in the chamber $a'$ of the filter.

$a^5$ is a vertical stand-pipe which passes through the filter-bed B and connects the chambers $a'$ and $a^2$.

C is a fluid-inlet pipe to the filter, and D is the outlet-pipe for filtered liquid.

$d$ is a collecting-pipe which is situated in the lower part of the filter-bed and connected to the outlet-pipe D.

$d'$ $d'$ are collecting-cups which project from the pipe $d$.

$d^2$ is a flap-valve in the pipe D, and $d^3$ is a hole or aperture in the flap-valve $d^2$.

E is a waste-pipe leading from the chamber $a'$.

F is a valve comprising a plug $f$, a spring $f'$, which tends to hold the plug $f$ to its seat, and a screw $f^2$, by the adjustment of which the compression of the spring $f'$, and consequently the load on the valve $f$, may be regulated.

G is a pipe connecting the valve F with the inlet side of the filter.

H is a chamber arranged to receive any liquid passing through the valve F.

I is a float-chamber arranged below the chamber H, and $h$ is a siphon adapted to rapidly transfer the liquid contents of the chamber H into the chamber I when the chamber H has been filled by the valve F.

$i$ is a float which is situated in the chamber I and is provided with a stem or rod $i'$.

$i^2$ is a siphon for emptying the float-chamber I after the latter has been filled.

$i^3$ is a valve or cock by the adjustment of which the action of the siphon $i^2$ can be regulated so as to empty the float-chamber I more or less rapidly.

J is a slide-valve cylinder or chamber arranged in the course of the inlet-pipe C.

$j$ is a piston-valve arranged so as to be capable of sliding in the cylinder J. The valve $j$ consists of two disks or junks $j'$ $j^2$, having an annular recess between them. The pipe C communicates with the cylinder J by means of ports $c$ and $c'$.

K is a closed cylinder in which a piston $k$ is adapted to slide.

$e$ is a valve controlling the outlet of the waste-pipe E.

$j^3$ is a rod connecting the slide-valve $j$, the piston $k$, and the valve $e$.

M is a distributing-valve, and $m$ is the chamber in which the valve M slides. The valve M consists of two disks or junks $m'$ and $m^2$, having a central annular recess between them, and $m^3$ is a central longitudinal waste or exhaust channel which passes through the valve M and connects the opposite sides of the valve-chamber $m$.

$m^4$ and $m^5$ are ports or passages respectively connecting the ends of the cylinder K with the opposite sides of the valve-chamber $m$.

$m^6$ is a central port in the valve-chamber $m$, and N is a pipe connecting the port $m^6$ with the inlet-pipe C at a point on the far side of the valve-cylinder or with other suitable pressure source.

$m^7$ is the waste or exhaust outlet from the valve-chamber $m$.

$m^8$ is a valve-rod one end of which is connected to the valve M. This valve-rod $m^8$ passes through the lower end of the valve-chamber $m$ and has its lower end connected by a rod O to one end of a rocking lever P. The rocking lever P is pivoted at $p$ to a projection on the float-chamber I and has its opposite end attached by a pin-and-slot connection to the float-stem $i'$.

Q is a float situated in the chamber $a^2$.

$q$ is a rod connecting the float Q to a valve $q'$. $q^2$ is a seat for the valve $q'$, and $q^3$ is an opening or port in the casing A controlled by the valve $q'$ The filter operates as follows: The tension of the spring $f'$ is adjusted so as to keep the valve-plug $f$ closed to its seat against the pressure of the liquid in the inlet-chamber $a^2$, so that when the filter-bed B is clean the chambers H and I are empty, the valves M, $j$, and $e$ are in the positions shown, and the upper side of the piston $k$ is open to the fluid-pressure through the port N, port $m^6$, annular passage in the valve M, and port $m^5$, and the lower side of the piston $k$ is open to exhaust through the port $m^4$, chamber $m$, and the exhaust or waste $m^7$. The liquid to be filtered then passes under pressure through the port $c$, the annular passage in the valve $j$, the port $c'$, and pipes C to the filter-chamber $a'$, and thence up through the stand-pipe $a^5$ and down through the filter-bed, and is then collected by the cups $d'\,d'$ and conducted away through the filtered-water outlet-pipe D to a suitable receiving vessel or reservoir, the force of the upward flow of the filtered liquid being sufficient to raise and pass by the flap-valve $d^2$.

When the filter-bed becomes silted up or foul, it offers a greater resistance to the passage of the liquid to be filtered, so that the pressure in the chambers $a'$ and $a^2$ is increased. This increased pressure is communicated by the pipe G to the valve $f$, and when the said pressure becomes sufficient to overcome the load exerted by the spring $f'$ on the valve $f$ the valve $f$ will be raised and liquid will be permitted to pass from the chamber $a^2$ through the pipe G and valve F into the chamber H. Directly the chamber H is filled to the required point the siphon $h$ comes into operation and rapidly transfers the liquid from the chamber H to the chamber I, thereby raising the float $i$, rod $i'$, and the end of the lever P which is attached to the rod $i'$ and lowering the opposite end of the lever P. This movement of the lever P is communicated by the connecting-rod O and valve rod $m^8$ to the distributing-valve M, which latter is thereby drawn down or reversed, so as to put the upper side of the piston $k$ to exhaust or waste through the port $m^5$, valve-chamber $m$, waste-channel $m^3$ in the valve M, and exhaust or waste port $m^7$, and to open the lower side of the piston $k$ to the fluid-pressure through the port $m^4$, annular passage in the valve M, and pipe N. The piston $k$ is thereby raised, and as it is fixed to the valve-rod $j^3$ the valve $j$ will be also raised, so as to close the port $c$, and the waste-valve $e$ will be opened. The filtered liquid will then flow back through the pipe D and entering the filter-bed B through the cups $d'\,d'$ will loosen and wash the filtering medium, overflow into the stand-pipe $a^5$, and then pass away through the waste-pipe E, carrying the impurities with it. When the flow of liquid through the filter is thus reversed by closing the inlet and opening the waste-pipe, the pressure within the filter is reduced and the valve $f$ is again closed by the spring $f'$, and when the chamber I has been emptied by the siphon $i^2$ the float $i$ will fall, thereby again reversing the valve M to the position shown in Fig. 1, when the lower side of the cylinder K is open to the waste $m^7$ through the port $m^4$ and chamber $m$ and the upper side of the piston $k$ is open to the fluid-pressure, so that filtering will again proceed.

Although liquid may only escape slowly through the valve F, yet, owing to the fact that the siphon $h$ rapidly transfers the contents of the chamber H to the chamber I the float $i$ is rapidly raised, and the action of the filter is reversed by a quick and decisive movement of the distributing-valve M.

The length of time for which the cleansing or reversed flow of liquid is permitted to pass through the filter obviously depends upon the length of time that the float $i$ remains raised. This can be regulated, as aforesaid, by adjusting the cock $i^3$ of the siphon $i^2$ so as to empty the chamber I more or less rapidly.

It is not advisable that the force of the reversed or cleansing flow of liquid through the filter should be so great as to wash away some of the filtering medium into the waste-pipe. To obviate this, the filtered liquid when reversed closes the valve $d^2$ and can then pass only through the passage $d^3$, which is of less sectional area than that of the pipe D.

The float Q is kept in its raised position by the pressure in the filter while filtering is proceeding, and the valve $q'$ is held to its seat $q^2$. When the supply-inlet is shut off and the waste is opened, as above described, however, the pressure within the filter is relieved and the float Q is permitted to fall, thus opening the valve $q'$ and permitting the external atmospheric air to enter the filter through the opening or port $q^3$.

Referring to Figs. 2 and 4, the filter-bed B rests upon a suitably-perforated plate or its equivalent $a^6$. The stand-pipe $a^5$ is omitted, as are also the collecting-cups $d'$. The outlet-pipe D for the filtered liquid leads from the filter-chamber $a'$ to a port $d^4$ in the valve-cylinder J. D' is a pipe connecting the lower end of the cylinder J with the filtered-liquid reservoir. E' is a waste-pipe leading from the upper end of the cylinder J. The lever P in this case has its end at one extremity pivoted at $p$ to the frame supporting the chamber H, its end at the opposite extremity being connected to the rod O, and the float-stem $i'$ being attached to it at an intermediate point by a pin-and-slot connection. The valve F is in this case constructed as an equilibrium valve, as follows: The plug $f$, provided with a suitable seat, has a stem $f^3$, which passes fluid-tight through a chamber $f^*$, then through a closed cylinder $f^4$, and has its upper end attached to one end of a rocking lever $f^5$. This rocking lever $f^5$ is pivoted at $f^6$ to an arm projecting from the cylinder $f^4$ and has its other end attached to one end of the spring $f'$. The other end of the spring $f'$ is secured to an arm $f^7$, which projects from the cylinder $f^4$. $f^2$ $f^2$ are nuts for adjusting the tension of the spring $f'$. $f^8$ is a piston which is arranged so as to be capable of sliding in the cylinder $f^4$ and is fixed to the valve-stem $f^3$. R is a pipe connecting the chamber $a^2$ of the filter with the upper end of the cylinder $f^4$, and S is a pipe connecting the chamber $a'$ of the filter with the lower end of the cylinder $f^4$. T is a liquid-supply pipe connecting the valve-chamber $f^*$ with any suitable source of liquor under pressure.

In Fig. 2 the float-valve Q is constructed and operates substantially as above described with reference to Fig. 1.

It is obvious that in order that the filtering may proceed the pressure in the chamber $a^2$, into which the liquid to be filtered flows, must be greater than the pressure in the chamber $a'$, from which the filtered liquid is withdrawn. The pressure conveyed through the pipe R and acting on the upper side of the piston $f^8$ is therefore greater than the pressure conveyed through the pipe S and acting upon the lower side of the piston $f^8$. This difference between the pressures on the respective sides of the piston $f^8$ is counteracted when the filter-bed B is clean by the spring $f'$, the tension of which spring can be adjusted as required. The spring $f'$ is so adjusted that when the filter-bed B is clean the valve $f$ is held to its seat. The chambers H and I are then empty and the valves $f$, M, and $j$ are in the positions shown in Fig. 2. The liquid to be filtered then enters the cylinder J by the port $c$, passes around the annular passage in the valve $j$, and thence through the port $c'$ to the chamber $a^2$ of the filter. The liquid then passes through the filter-bed B into the chamber $a'$ and then through the pipe D and port $d^4$ into the lower end of the cylinder J, below the valve $j$. From this lower end of the cylinder J the filtered-liquid is conveyed by the pipe D' to the filtered liquid reservoir. When the filter-bed becomes foul or silted up, increased pressure is required to force the liquid through the filtering medium, so that the pressure in the chamber $a^2$ increases, while the pressure in the chamber $a'$ in the outlet side of the filter-bed may not increase. The pressure conveyed through the pipe R and acting on the upper face of the piston $f^8$ is therefore increased, while the pressure conveyed through the pipe S and acting on the lower face of the piston $f^8$ may not be increased. When this increase in pressure in the chamber $a^2$ reaches a given point, (which point is determined by the degree of tension of the spring $f'$) the piston $f^8$ and valve-stem $f^3$ will be automatically lowered, the valve $f'$ opened, and liquid permitted to pass from the pipe T into the chamber H. The siphon $h$, float $i$, siphon $i^2$, and lever P will operate as previously described, the connecting-rod O and valve-stem $m^3$ being raised and the valve M reversed, so as to open the upper face of the piston $k$ to the fluid-pressure through the port $m^6$, annular passage in the valve M, and port $m^5$ and to put the lower face of the piston $k$ to waste through the port $m^4$, chamber $m$, and port $m^7$. The piston $k$ and valve-rod $j^3$ are thereby lowered and the valve $j$ reversed, so as to connect the ports $c$ and $d^4$ through the annular passage in the valve $j$ to close the pipe D' and to connect the port $c'$ with the waste-pipe E'. The unfiltered liquid then passes through the port $c$, annular passage in the valve $j$, and pipe D into the chamber $a'$, and thence up through the filtering medium into the chamber $a^2$, through the port $c'$, and upper end of the cylinder J to the waste-pipe E', the filter-bed being thereby loosened and washed and the impurities carried away. When the flow of liquid is thus reversed, the pressure in the chamber $a^2$, and consequently upon the upper face of the piston $f^8$, decreases. The spring $f'$ then closes the valve $f$. When the chamber I has been emptied by the siphon $i^2$, as previously described, the float $i$ falls, the valve M is reversed, so as to put the upper face of the piston $k$ to waste through the port $m^5$, chamber $m$, valve-channel $m^3$, and port $m^7$, while the lower face of the piston $k$ is again opened to fluid-pressure through the port $m^4$, annular passage in the valve M, and port $m^5$. The valve $j$ is thereby again raised to the position shown in Fig. 2 and the filtering proceeds.

What I claim is—

1. In a filter the combination with the filter-bed, the unfiltered-liquid inlet, the filtered-liquid outlet and the waste-pipe, of means operated by the increase in the difference of the pressure between the inlet side of the filter and outlet side of the filter when the filter-bed becomes foul, whereby the flow of liquid through the filter is automatically reversed substantially as described, for the purpose specified.

2. In a filter the combination with the filter-bed, the unfiltered-liquid inlet, the filtered-liquid outlet and the waste-pipe, of means operated by the increase in the difference of the pressure between the inlet side of the filter and the outlet side of the filter when the filter-bed becomes foul, whereby the flow of liquid through the filter is automatically reversed so as to cleanse the filter-bed, and the filtering operation automatically restarted after the filter-bed has been cleansed, substantially as described.

3. In a filter the combination with the filter-bed the unfiltered-liquid inlet, the filtered-liquid outlet, and the waste-pipe, of a spring-valve, means connecting the said valve with the internal filter-pressure, and means operated automatically by said valve for reversing the flow of liquid through the filter-bed when the latter becomes foul, substantially as described for the purpose specified.

4. In a filter the combination with the filter-bed, the unfiltered-liquid inlet, the filtered-liquid outlet and the waste-pipe, of a spring-valve, means connecting the said valve with the internal filter-pressure, and means operated automatically by said valve for reversing the flow of liquid through the filter-bed when the latter becomes foul and for restarting the filtering after the filter-bed is cleansed, substantially as described.

5. In a filter the combination with the filter-bed, the unfiltered-liquid inlet, the filtered-liquid outlet and the waste-pipe, of a slide-valve controlling the unfiltered-liquid inlet, a waste-valve for controlling the waste-pipe, a rod connecting the said slide-valve and waste-valve, and means for automatically operating said valves so as to close the unfiltered-liquid inlet and open the waste-pipe when the filter-bed is foul, and to close the waste-pipe and open the unfiltered-liquid inlet after the filter is cleansed, substantially as described.

6. In a filter the combination with the filter-bed, the unfiltered-liquid inlet, the filtered-liquid outlet, the waste-pipe, and means for automatically reversing the flow of liquid through the filter-bed when the latter becomes foul, of means located in the filtered-liquid outlet to restrict the backward flow of filtered liquid when the direction of the flow through the filter is reversed for cleansing purposes, substantially as described, for the purpose specified.

7. In a filter the combination with the filter-bed, the unfiltered-liquid inlet, the filtered-liquid outlet and the waste-pipe, of a slide-valve controlling the unfiltered-liquid inlet the filtered-liquid outlet and the waste-pipe, a piston, a closed cylinder containing said piston, a rod connecting said piston with the said slide-valve, a distributing-valve for controlling a supply of fluid under pressure to the said cylinder, and means for automatically operating the distributing-valve so as to reverse the piston and slide-valve when the filter-bed is foul and to again reverse the piston and slide-valve after the filter-bed has been cleansed, substantially as described.

8. In a filter the combination with the filter-bed, the unfiltered-liquid inlet, the filtered-liquid outlet, and the waste-pipe, of a spring-valve controlling a liquid-supply pipe, means for adjusting the load on said valve, means for controlling said valve by the internal filter-pressure, and means operated automatically by said valve for reversing the flow of liquid through the filter-bed when the latter becomes foul and for restarting the filtering after the filter-bed is cleansed, substantially as described.

9. In a filter the combination with the filter-bed, the unfiltered-liquid inlet, the filtered-liquid outlet and the waste-pipe, of a valve-chamber, a valve controlling the outlet of said valve-chamber, a liquid-supply pipe connected to said valve-chamber, a closed cylinder, a piston in said cylinder, pipes respectively connecting the opposite ends of said cylinder with the inlet and outlet of the filter, a rod passing through the valve-chamber and cylinder and having the valve and piston attached thereto, an adjustable spring which tends to hold the valve closed, and means operated automatically by said valve for reversing the flow of liquid through the filter-bed when the latter is foul and for restarting the filtering after the filter-bed has been cleansed, substantially as described.

10. In a filter the combination with the filter-bed, the unfiltered-liquid inlet, the filtered-liquid outlet and the waste-pipe, of a spring-valve controlling a liquid-supply, means for adjusting the load on said valve, means for controlling the said valve by the internal filter-pressure, a chamber into which the valve discharges liquid when the filter-bed is foul, a float-chamber below the first-mentioned chamber, a siphon connecting the first-mentioned chamber with the float-chamber, a float in said float-chamber, a siphon for emptying the float-chamber, and means automatically operated by said float for reversing the flow of liquid through the filter-bed when the latter becomes foul and for restarting the filtering after the filter-bed is cleansed, substantially as described.

11. In a filter the combination with the filter-bed, the unfiltered-liquid inlet the filtered-liquid outlet and the waste-pipe, of a spring-valve controlling a liquid-supply pipe, means for adjusting the load on said valve, means for controlling the valve by the internal filter-pressure, a chamber into which the spring-valve discharges liquid when the filter-bed is foul, a float-chamber below the first-mentioned chamber, a siphon connecting the first-mentioned chamber with the float-chamber, an adjustable siphon for emptying said float-chamber, a float in said float-chamber, a slide-valve controlling the unfiltered-liquid inlet the filtered-liquid outlet and the waste-pipe, and means connecting said float to the slide-valve so that the latter is automatically reversed when the filter-bed becomes foul and is again reversed to restart the filtering after the filter-bed is cleansed, substantially as described.

12. In a filter the combination with the filter-bed, the unfiltered-liquid inlet, the filtered-liquid outlet and the waste-pipe, of a spring-valve controlling a liquid-supply pipe, means for adjusting the load on said valve, means for controlling said valve by the internal filter-pressure, a chamber into which the spring-valve discharges liquid when the filter-bed is foul, a float-chamber below the first-mentioned chamber, a siphon connecting the first-mentioned chamber with the float-chamber, an adjustable siphon for emptying the float-chamber, a float in said float-chamber, a rod fixed to said float, a lever connected to said float-rod, a slide-valve controlling the unfiltered-liquid inlet the filtered-liquid outlet and the waste-pipe, a piston, a closed cylinder containing said piston, a rod connecting said piston with the slide-valve, a distributing-valve for controlling a supply of fluid under pressure to the said cylinder, a valve-rod on said distributing-valve, and a connecting-rod connecting said distributing-valve rod to the said lever, substantially as described for the purpose specified.

13. In a filter the combination with the filter-bed, the unfiltered-liquid inlet, the filtered-liquid outlet and the waste-pipe, of a spring-valve controlling a liquid-supply pipe, means for adjusting the load on said valve, means for controlling said valve by the internal filter-pressure, a chamber into which the spring-valve discharges liquid when the filter-bed is foul, a float-chamber below the first-mentioned chamber, a siphon connecting the first-mentioned chamber with the float-chamber, an adjustable siphon for emptying the float-chamber, a float in said float-chamber, a rod fixed to said float, a lever connected to said float-rod, a slide-valve controlling the unfiltered-liquid inlet, a closed cylinder, a piston in said cylinder, a waste-valve for controlling the waste-pipe, a rod connecting the slide-valve the piston and the waste-valve, a distributing-valve for controlling a supply of fluid under pressure to the said cylinder, a valve-rod on said distributing-valve, a connecting-rod connecting said distributing-valve rod to the said lever, and a float-valve in the filter-casing to admit air to the filter when the flow of liquid is reversed for cleansing the filter-bed, substantially as described for the purpose specified.

In testimony whereof I have hereunto set my hand, in presence of two subscribing witnesses, this 10th day of October, 1899.

WILLIAM PATERSON.

Witnesses:
FRED C. HARRIS,
F. W. MCLELLAN.